(12) United States Patent
Davis et al.

(10) Patent No.: US 10,167,730 B2
(45) Date of Patent: Jan. 1, 2019

(54) SLIDING SEAL

(71) Applicant: UNITED TECHNOLOGIES CORPORATION, Farmington, CT (US)

(72) Inventors: Timothy M. Davis, Kennebunk, ME (US); Paul M. Lutjen, Kennebunkport, ME (US); Mark J. Rogers, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 428 days.

(21) Appl. No.: 14/830,818

(22) Filed: Aug. 20, 2015

(65) Prior Publication Data
US 2016/0186588 A1    Jun. 30, 2016

Related U.S. Application Data

(60) Provisional application No. 62/068,482, filed on Oct. 24, 2014.

(51) Int. Cl.
| F16J 15/02 | (2006.01) |
| F01D 11/00 | (2006.01) |
| F16J 15/06 | (2006.01) |
| F16J 15/08 | (2006.01) |
| F16J 15/10 | (2006.01) |

(52) U.S. Cl.
CPC ......... *F01D 11/005* (2013.01); *F16J 15/065* (2013.01); *F16J 15/067* (2013.01); *F16J 15/0806* (2013.01); *F16J 15/0887* (2013.01); *F16J 15/102* (2013.01); *F16J 15/104* (2013.01); *F05D 2220/32* (2013.01); *F05D 2240/55* (2013.01); *F05D 2300/10* (2013.01); *F05D 2300/20* (2013.01); *Y02T 50/672* (2013.01)

(58) Field of Classification Search
CPC ..... F16J 15/025; F01D 11/005; F01D 15/067; F01D 15/0887; F01D 15/104; F01D 15/065

See application file for complete search history.

(56) References Cited

U.S. PATENT DOCUMENTS

| 4,783,085 | A | 11/1988 | Wicks et al. |
| 5,014,917 | A | 5/1991 | Sirocky et al. |
| 6,419,237 | B1 * | 7/2002 | More ............... E21B 33/03 277/602 |
| 7,090,224 | B2 * | 8/2006 | Iguchi ............. F01D 11/005 277/603 |
| 7,121,790 | B2 | 10/2006 | Fokine et al. |
| 7,347,425 | B2 | 3/2008 | James |

(Continued)

*Primary Examiner* — Vishal A Patel
(74) *Attorney, Agent, or Firm* — Cantor Colburn LLP

(57) ABSTRACT

The present disclosure relates generally to a sliding seal between two components. The sliding seal includes a first seal section including one or more first slots formed therein, a second seal section including one or more second slots formed therein and one or more frustoconical rings disposed in respective ones of the slots, such that the first and second seal sections and the frustoconical rings move relative to one another during relative movement between the two components. A wave spring disposed between the first and second seal sections biases the first and second seal sections away from one another.

20 Claims, 6 Drawing Sheets

(56) References Cited

U.S. PATENT DOCUMENTS

| | | | |
|---|---|---|---|
| 7,451,989 B1 * | 11/2008 | Cornett | F16J 15/0806 |
| | | | 277/626 |
| 20,090,243 | 10/2009 | Heinemann et al. | |
| 7,784,264 B2 * | 8/2010 | Weaver | F01D 9/023 |
| | | | 60/39.37 |
| 8,651,497 B2 | 2/2014 | Tholen et al. | |
| 8,714,565 B1 * | 5/2014 | Cornett | F01D 11/005 |
| | | | 277/644 |
| 8,985,592 B2 * | 3/2015 | Green | F01D 9/023 |
| | | | 277/637 |
| 9,140,388 B2 * | 9/2015 | Baca | F16J 15/025 |
| 2013/0113168 A1 | 5/2013 | Lutjen et al. | |

\* cited by examiner

SLIDING SEAL

CROSS REFERENCE TO RELATED APPLICATION

This application claims the benefit of and incorporates by reference herein the disclosure of U.S. Ser. No. 62/068,482, filed Oct. 24, 2014.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about an axial centerline is disclosed, the seal comprising: a first seal section including one or more first slots formed therein; and a second seal section including one or more second slots formed therein; wherein the first and second seal sections are configured to sealingly engage with the first and second components; one or more frustoconical rings each including a first end and a second end, wherein each of the first ends is disposed in a respective one of the first slots and each of the second ends is disposed in a respective one of the second slots; a wave spring disposed between the first and second seal sections and operative to bias the first seal section away from the second seal section; and wherein the first and second seal sections and the one or more frustoconical rings are configured to move relative to one another.

In a further embodiment of the above, the first seal section, the second seal section and the wave spring comprise components selected from the group consisting of: full hoop component and split hoop component.

In a further embodiment of any of the above, a first substantially rounded protrusion is provided extending from the first seal section and in contact with the first component along a first single line of contact selected from the group consisting of: circumferential line of contact and semi-circumferential line of contact; and a second substantially rounded protrusion is provided extending from the second seal section and in contact with the second component along a second single line of contact selected from the group consisting of: circumferential line of contact and semi-circumferential line of contact.

In a further embodiment of any of the above, each of the one or more frustoconical rings comprise split frustoconical rings.

In a further embodiment of any of the above, the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, a coating is applied to at least a portion of each of the first and second seal sections.

In a further embodiment of any of the above, a sheath is provided covering at least a portion of each of the first and second seal sections.

In a further embodiment of any of the above, a plurality of tabs are provided extending from the first seal section and/or the second seal section and wrapping over a radially outer edge of the wave spring.

In a further embodiment of any of the above, a first compliant seal is disposed between the first seal section and the first component; and a second compliant seal is disposed between the second seal section and the first component.

In a further embodiment of any of the above, the first and second compliant seals are selected from the group consisting of: woven ceramic rope seal, braided ceramic rope seal, and flat ceramic textile fabric.

In another embodiment, a system is disclosed, comprising: a first component including a first surface; a second component including a second surface, the second component disposed adjacent the first component and defining a seal cavity therebetween; wherein the first and second components are disposed about an axial centerline; and a seal disposed in the seal cavity, the seal including: a first seal section including one or more first slots formed therein; and a second seal section including one or more second slots formed therein; one or more frustoconical rings each including a first end and a second end, wherein each of the first ends is disposed in a respective one of the first slots and each of the second ends is disposed in a respective one of the second slots; a wave spring disposed between the first and second seal sections and operative to bias the first seal section away from the second seal section; and wherein pressure within the seal cavity urges the seal to seat against the first surface and the second surface; and wherein relative movement of the first component and the second component toward or away from one another causes the first and second seal sections and the one or more frustoconical rings to slide relative to one another such that the seal is not substantially deflected over a portion of its range of motion.

In a further embodiment of any of the above, the first seal section, the second seal section and the wave spring comprise components selected from the group consisting of: full hoop component and split hoop component.

In a further embodiment of any of the above, a first substantially rounded protrusion is provided extending from the first seal section and in contact with the first component along a first single line of contact selected from the group consisting of: circumferential line of contact and semi-circumferential line of contact; and a second substantially rounded protrusion is provided extending from the second seal section and in contact with the second component along a second single line of contact selected from the group consisting of: circumferential line of contact and semi-circumferential line of contact.

In a further embodiment of any of the above, each of the one or more frustoconical rings comprise split frustoconical rings.

In a further embodiment of any of the above, the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, a coating is applied to at least a portion of each of the first and second seal sections.

In a further embodiment of any of the above, a sheath is provided covering at least a portion of each of the first and second seal sections.

In a further embodiment of any of the above, a plurality of tabs are provided extending from the first seal section and/or the second seal section and wrapping over a radially outer edge of the wave spring.

In a further embodiment of any of the above, a first compliant seal is disposed between the first seal section and the first component; and a second compliant seal is disposed between the second seal section and the first component.

In a further embodiment of any of the above, the first and second compliant seals are selected from the group consisting of: woven ceramic rope seal, braided ceramic rope seal, and flat ceramic textile fabric.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
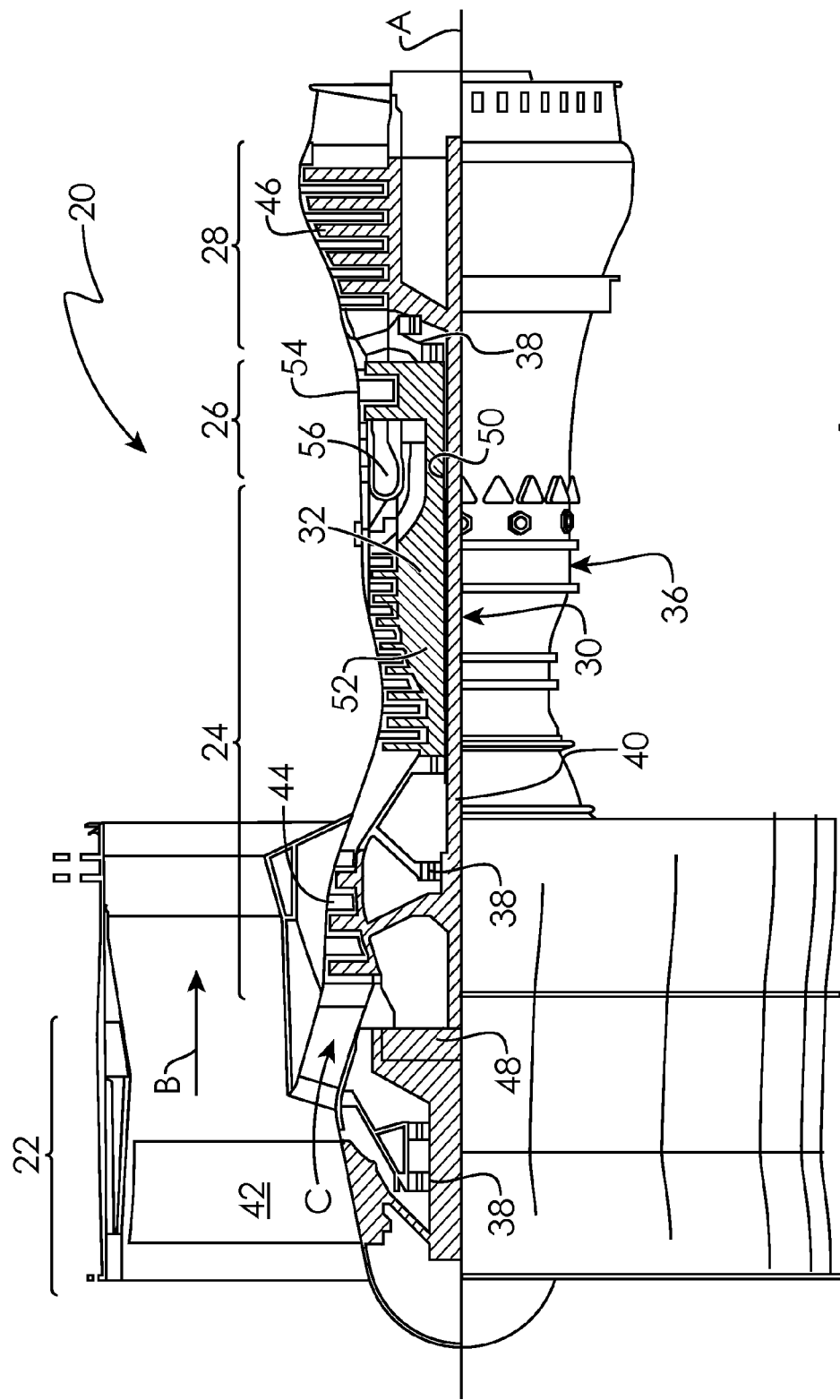
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7\ °\ R)]^{0.5}$. The "Low corrected fan tip speed" as disclosed herein according to one non-limiting embodiment is less than about 1150 ft/second (350.5 m/sec).

Figure 2:
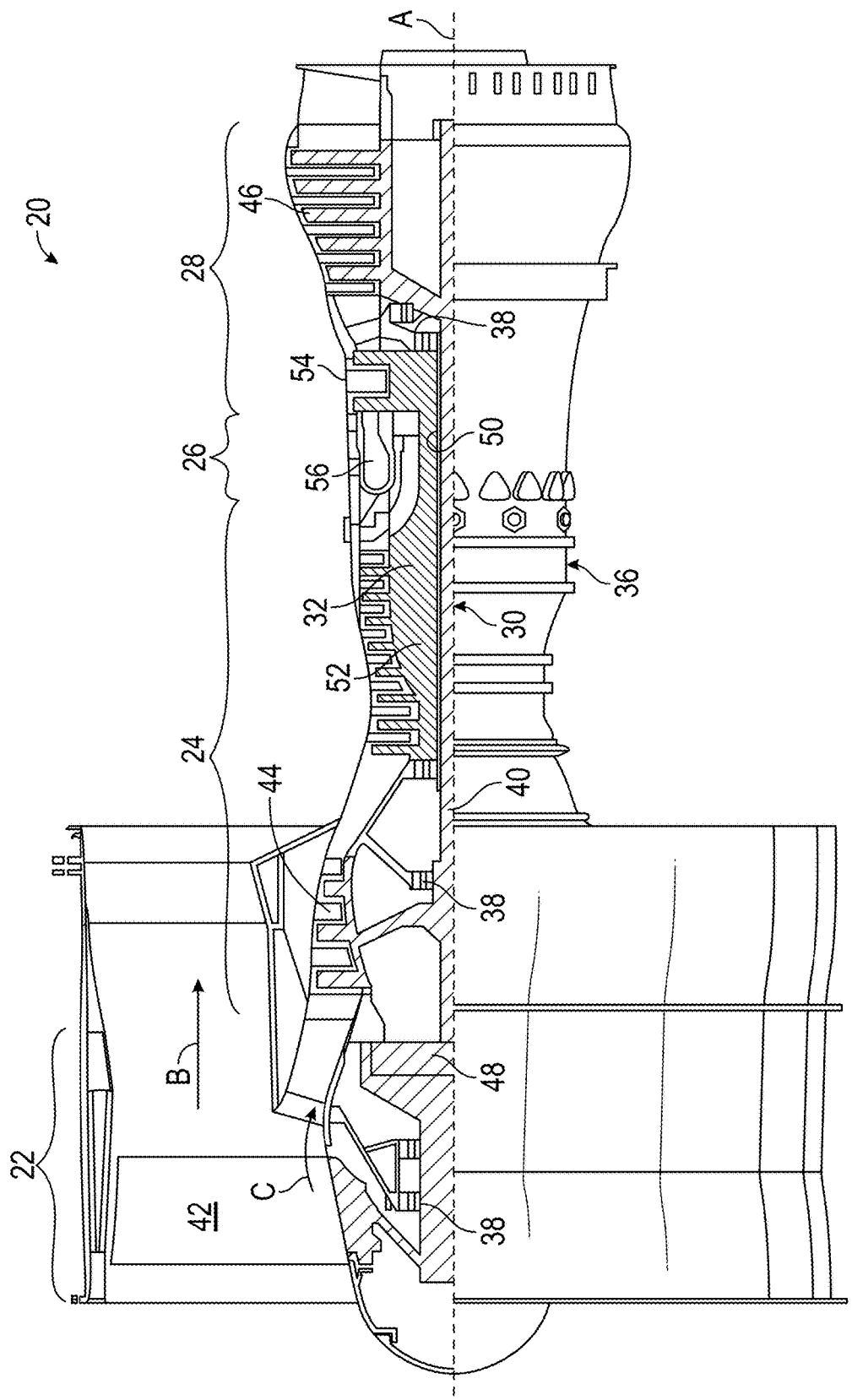
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform.

Figure 3:
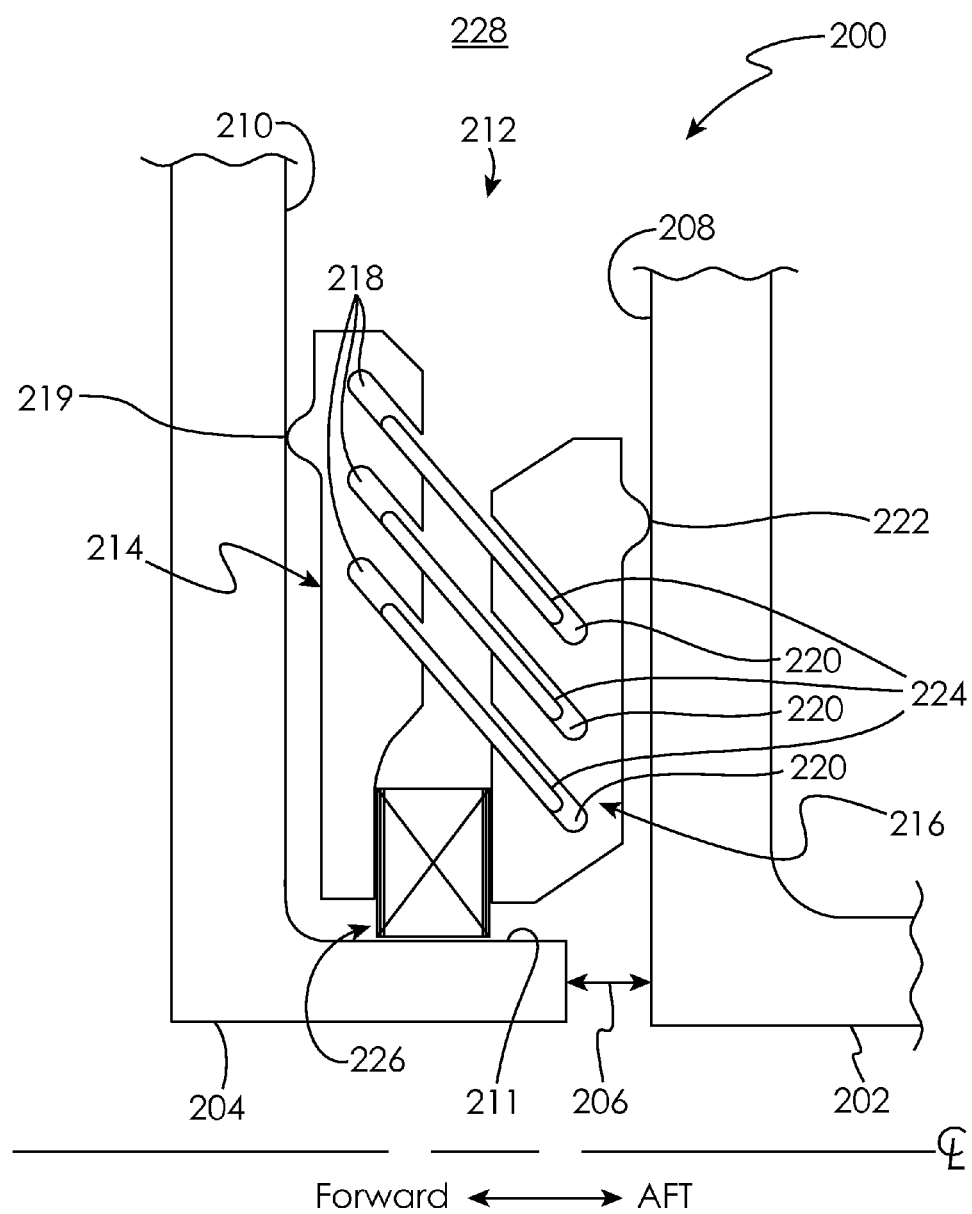
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. In one embodiment, the seal 212 is formed from a full hoop first seal section 214 and a split second seal section 216. In other embodiments, one or both of the seal sections 214, 216 can be full hoop or split. The first seal section 214 includes one or more slots 218 formed into an aft side thereof, while the second seal section 216 includes one or more slots 220 formed into a forward side thereof.

In an embodiment, the seal section 214 includes a forward substantially rounded protrusion 219 in contact with the surface 210 such that the seal section 214 contacts the surface 210 along a single circumferential (in the case of a full hoop component) or semi-circumferential (in the case of a split hoop component) line of contact. As used herein, the phrases "circumferential line of contact" and "semi-circumferential line of contact" include lines with a nominal radial or axial thickness. In an embodiment, the seal section 216 includes an aft substantially rounded protrusion 222 in contact with the surface 208 such that the seal section 216 contacts the surface 208 along a single circumferential (in the case of a full hoop component) or semi-circumferential (in the case of a split hoop component) line of contact.

In an embodiment, the seal sections 214, 216 may be machined from a single piece of material, or they may be extruded in their cross-sectional shape and then a length of the extrusion may be bent/rolled into a hoop, followed by joining the two ends (for example, by laser welding or electron beam welding) to form a continuous hoop, to name just a couple of non-limiting examples.

Figure 4:
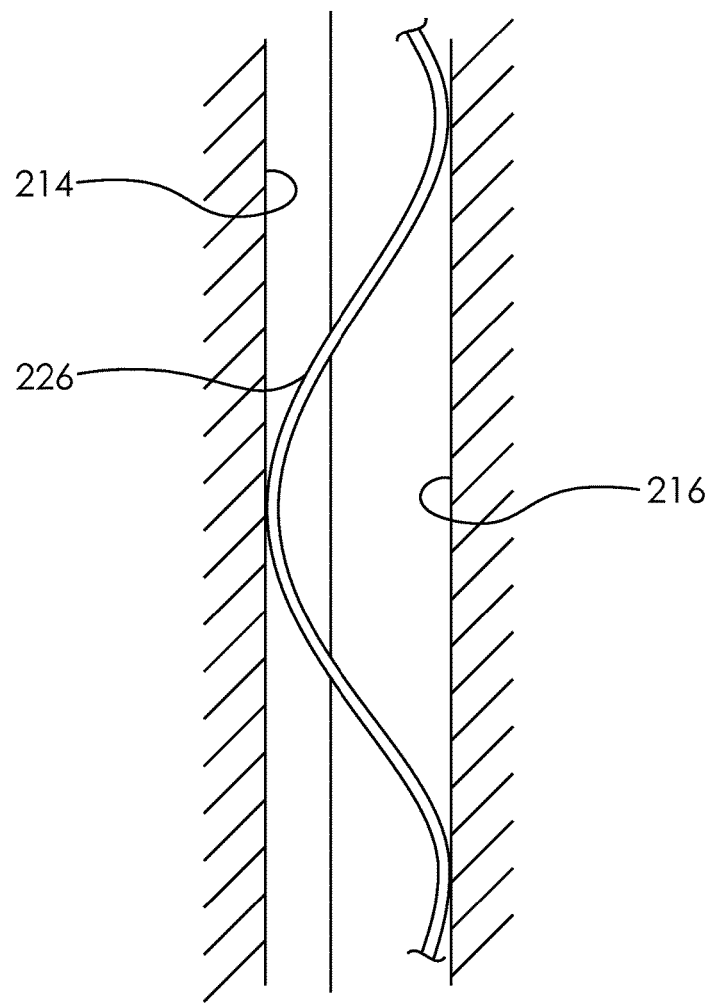
FIG. 4 is a schematic plan view of a wave spring in an embodiment.

Seal 212 further comprises one or more radially-oriented frustoconical rings 224. A forward end of each ring 224 is disposed in a respective one of the one or more slots 218 in the seal section 214, while an aft end of each ring 224 is disposed in a respective one of the one or more slots 220 in the seal section 216. Each of the one or more rings 224 may be split at one circumferential location to enable each ring 224 to more easily slide within the slots 218, 220 of the seal sections 214, 216. A split hoop or full hoop wave spring 226 is disposed within the cavity defined by the seal section 214, the seal section 216, the radially innermost ring 224, and the surface 211 of the component 204. A plan view of a portion of the wave spring 226 is illustrated in FIG. 4. The seal 212 components may include a coating and/or a sheath to provide increased wear resistance.

Pressure in a secondary flow cavity 228 is transmitted to the seal cavity 200 through an opening defined by the components 202, 204. This pressure acts upon the surfaces of the seal sections 214, 216 and the rings 224, thereby loading and seating/sealing the rings 224 against the slots 218, 220. This pressure also causes the seal section 214 to seat against the surface 210 of the component 204 at the protrusion 219, and additionally causes the seal section 216 to seat against the surface 208 of the component 202. This prevents most or all of the secondary flow cavity 228 gases from reaching the design clearance 206 area and flow path. As the two components 202 and 204 move relative to each other in the axial and/or radial direction, the seal sections 214, 216 are substantially free to move relative to one another in the axial, radial, and circumferential directions and the rings 224 are substantially free to slide in the slots 218, 220 in the axial, radial, and circumferential directions, while the pressure forces acting upon the surfaces of the seal sections 214, 216 and the rings 224 load the seal 212 so that it remains in contact with both components 202 and 204 as shown. Therefore, sealing is maintained while the components 202 and 204 and the components of the seal 212 move relative to one another. Because the seal sections 214, 216 and rings 224 slide with respect to one another and with respect to the components 202, 204, the seal 212 is not substantially deflected by the relative movement between the components 202 and 204. When the seal 212 is compressed to the point that the rings 224 are no longer able to simply slide within the slots 218, 220, the thin frustoconical rings 224 are able to flex which enables the seal 212 to be that much more resilient.

Furthermore, the circumferentially-oriented wave spring 234 pushes the seal section 214 to remain in contact with the forward wall 210, and also pushes the seal section 216 to remain in contact with the aft wall 208 when the cavity 200 is not pressurized. This prevents the seal 212 from being damaged during transportation and installation, and also ensures that the seal 212 is instantly and positively pressurized/pressure-energized at engine start-up. In operation, both seal sections 214, 216 are pressure loaded against walls 210, 208 because the contact points 219, 222 are well outboard, ensuring good sealing at the contact points 219, 222.

Figure 5:
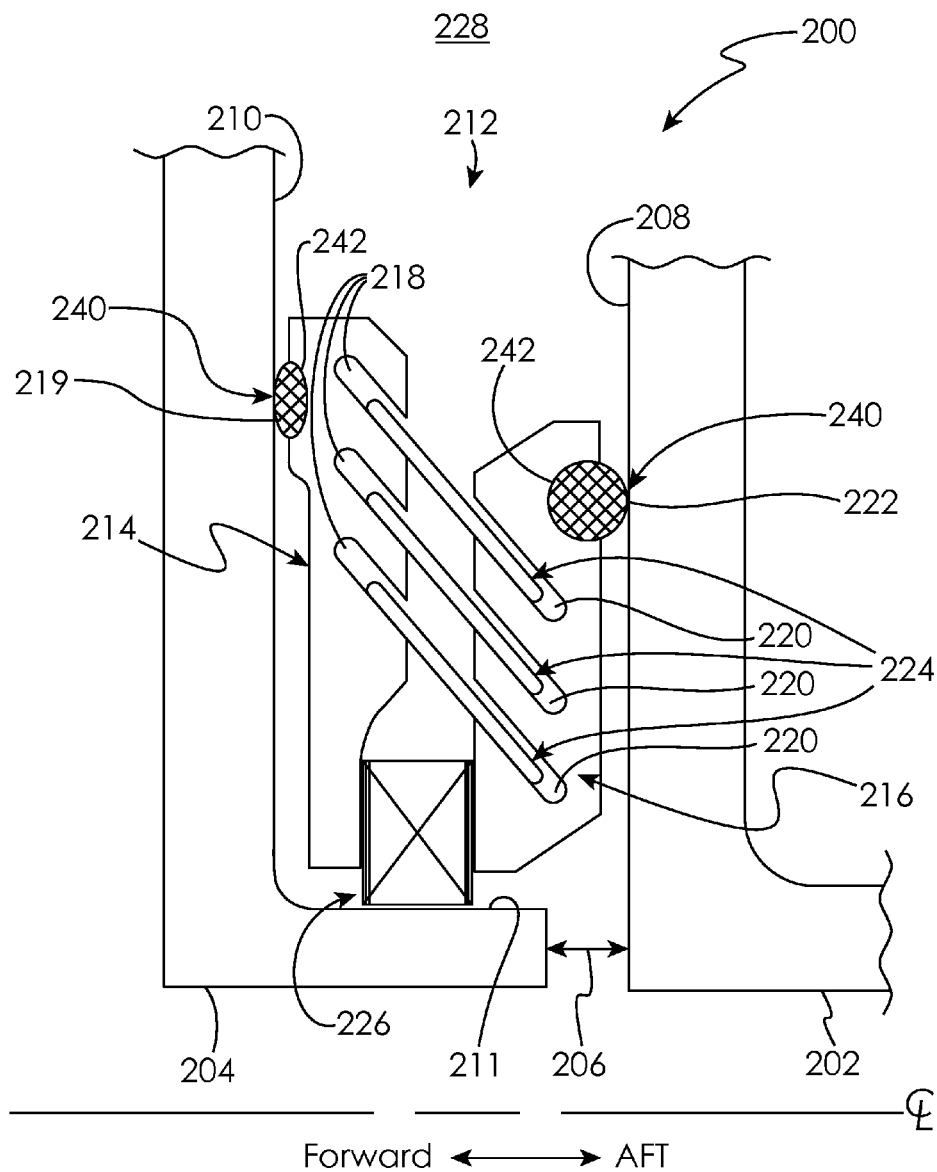
FIG. 5 is a schematic cross-sectional view of a seal and seal cavity in an embodiment.

In the embodiment of FIG. 5, the seal 212 may include a full hoop or split hoop high-temperature and compliant seal 240, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the components 202, 204 in some embodiments. The compliant seal 240 may be disposed between the seal section 214 and the surface 210 of the component 204, as well as between the seal section 216 and the surface 208 of the component 202. The compliant seal 240 may be bonded to or mechanically attached to the seal section 214, 216 (such as by mounting the seal 240 into slots 242 formed into the seal sections 214, 216, to name just one non-limiting example) or to the component 202, 204. The compliant seal 240 adds compliance to the seal 212 in the axial direction.

Figure 6:
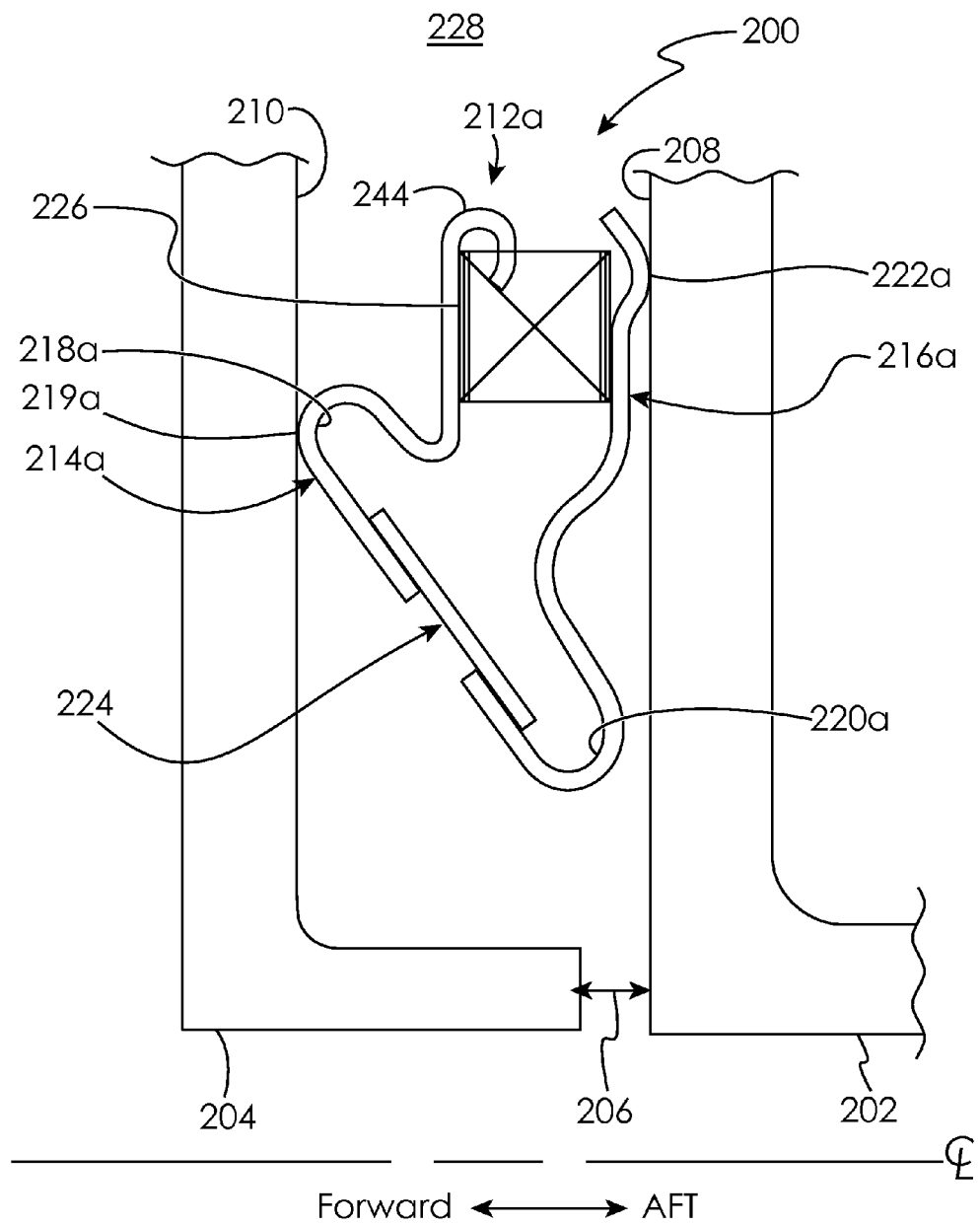
FIG. 6 is a schematic cross-sectional view of a seal and seal cavity in an embodiment.

Another embodiment sliding seal is illustrated in FIG. 6 and indicated generally at 212a. The seal 212a is similar in operation to the seal 212; however, the seal 212a is configured for ease of manufacturing the seal 212a from sheet stock, such as sheet metal to name just one non-limiting example. The seal 212a is formed from a full hoop first seal section 214a and a split second seal section 216a. The first seal section 214a includes one or more slots 218a formed into an aft side thereof, while the second seal section 216a includes one or more slots 220a formed into a forward side thereof. Additional slots 218a, 220a may be formed by including additional undulations to the radially inner ends of the seal sections 214a, 216a.

In an embodiment, the seal section 214a includes a forward substantially rounded protrusion 219a in contact with the surface 210 such that the seal section 214a contacts the surface 210 along a single semi-circumferential line of contact. In an embodiment, the seal section 216a includes an aft substantially rounded protrusion 222a in contact with the surface 208 such that the seal section 216a contacts the surface 208 along a single semi-circumferential line of contact.

Seal 212a further comprises one or more radially-oriented frustoconical rings 224. A forward end of each ring 224 is disposed in a respective one of the one or more slots 218a in the seal section 214a, while an aft end of each ring 224 is disposed in a respective one of the one or more slots 220a in the seal section 216a. Each of the one or more rings 224 is split at one circumferential location to enable each ring 224 to slide within the slots 218a, 220a of the seal sections 214a, 216a. A full hoop or split hoop wave spring 226 is disposed within the cavity defined by the seal section 214a, the seal section 216a, and the radially outermost ring 224. The wave spring 226 may be limited in its radial movement by one or more tabs 244 extending from the radially outermost end of the seal section 214a and/or the seal section 216a. The seal 212a components may include a coating and/or a sheath to provide increased wear resistance.

Compared to the seal 108, the seal sections 214, 216 (and 214a, 216a) are not substantially deflected as the components 202 and 204 move relative to each other during engine assembly and engine operation, which is beneficial because the seal sections 214, 216 (and 214a, 216a) can be made from a lower strength and/or thicker sheet material that may be lower cost, have higher temperature capability, be more manufacturable, more wear-resistant, and/or more wear tolerant. The seal 212/212a may be more resilient (axially) than the seal 108 because the ring(s) 224 may be more flexible than the outer convolutions of the seal 108 because the inner diameters are simply supported rather than cantilevered. Additionally, the rings 224 are also able to slide within the slots to enable significant axial travel before experiencing any bending loads. Furthermore, the seal 212/212a is less susceptible to distortion or breakage, which can cause leakage of gas past the seal 212/212a and/or liberation of the seal. Also, where a compliant seal 240 is incorporated, the seal 212 is more compliant against segmented/stair-stepped end-walls of the components 202, 204. Additionally, the seal 212/212a is more tolerant of high-temperature conductive heat loads from flowpath parts since the seal sections 214, 216 (and 214a, 216a) are much lower stressed than the base of the convolutions on the seal 108.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second adjacent components disposed about an axial centerline, the seal comprising:
    a first seal section including one or more first slots formed therein; and
    a second seal section including one or more second slots formed therein;
    wherein the first and second seal sections are configured to sealingly engage with the first and second components;
    one or more frustoconical rings each including a first end and a second end, wherein each of the first ends is disposed in a respective one of the first slots and each of the second ends is disposed in a respective one of the second slots;
    a wave spring disposed between the first and second seal sections and operative to bias the first seal section away from the second seal section; and
    wherein the first and second seal sections and the one or more frustoconical rings are configured to move relative to one another.

2. The seal of claim 1, wherein the first seal section, the second seal section and the wave spring comprise components selected from the group consisting of: full hoop component and split hoop component.

3. The seal of claim 1, further comprising:
a first substantially rounded protrusion extending from the first seal section and in contact with the first component along a first single line of contact selected from the group consisting of: circumferential line of contact and semi-circumferential line of contact; and
a second substantially rounded protrusion extending from the second seal section and in contact with the second component along a second single line of contact selected from the group consisting of: circumferential line of contact and semi-circumferential line of contact.

4. The seal of claim 1, wherein each of the one or more frustoconical rings comprise split frustoconical rings.

5. The seal of claim 1, wherein the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

6. The seal of claim 1, further comprising:
a coating applied to at least a portion of each of the first and second seal sections.

7. The seal of claim 1, further comprising:
a sheath covering at least a portion of each of the first and second seal sections.

8. The seal of claim 1, further comprising a plurality of tabs extending from the first seal section and/or the second seal section and wrapping over a radially outer edge of the wave spring.

9. The seal of claim 1, further comprising:
a first compliant seal disposed between the first seal section and the first component; and
a second compliant seal disposed between the second seal section and the first component.

10. The seal of claim 9, wherein the first and second compliant seals are selected from the group consisting of: woven ceramic rope seal, braided ceramic rope seal, and flat ceramic textile fabric.

11. A system, comprising:
a first component including a first surface;
a second component including a second surface, the second component disposed adjacent the first component and defining a seal cavity therebetween;
wherein the first and second components are disposed about an axial centerline; and
a seal disposed in the seal cavity, the seal including:
a first seal section including one or more first slots formed therein; and
a second seal section including one or more second slots formed therein;
one or more frustoconical rings each including a first end and a second end,
wherein each of the first ends is disposed in a respective one of the first slots and each of the second ends is disposed in a respective one of the second slots;
a wave spring disposed between the first and second seal sections and operative to bias the first seal section away from the second seal section; and
wherein pressure within the seal cavity urges the seal to seat against the first surface and the second surface; and
wherein relative movement of the first component and the second component toward or away from one another causes the first and second seal sections and the one or more frustoconical rings to slide relative to one another such that the seal is not substantially deflected over a portion of its range of motion.

12. The seal of claim 11, wherein the first seal section, the second seal section and the wave spring comprise components selected from the group consisting of: full hoop component and split hoop component.

13. The seal of claim 11, further comprising:
a first substantially rounded protrusion extending from the first seal section and in contact with the first component along a first single line of contact selected from the group consisting of: circumferential line of contact and semi-circumferential line of contact; and
a second substantially rounded protrusion extending from the second seal section and in contact with the second component along a second single line of contact selected from the group consisting of: circumferential line of contact and semi-circumferential line of contact.

14. The seal of claim 11, wherein each of the one or more frustoconical rings comprise split frustoconical rings.

15. The seal of claim 11, wherein the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

16. The seal of claim 11, further comprising:
a coating applied to at least a portion of each of the first and second seal sections.

17. The seal of claim 11, further comprising:
a sheath covering at least a portion of each of the first and second seal sections.

18. The seal of claim 11, further comprising a plurality of tabs extending from the first seal section and/or the second seal section and wrapping over a radially outer edge of the wave spring.

19. The seal of claim 11, further comprising:
a first compliant seal disposed between the first seal section and the first component; and
a second compliant seal disposed between the second seal section and the first component.

20. The seal of claim 19, wherein the first and second compliant seals are selected from the group consisting of: woven ceramic rope seal, braided ceramic rope seal, and flat ceramic textile fabric.

\* \* \* \* \*